United States Patent
Jeong et al.

(10) Patent No.: US 8,228,934 B2
(45) Date of Patent: Jul. 24, 2012

(54) METHOD OF PERFORMING ROUTING AND ALLOCATING RESOURCES IN WIRELESS SENSOR NETWORK

(75) Inventors: Wun-Cheol Jeong, Daejeon (KR); Nae Soo Kim, Daejeon (KR); Cheol Sig Pyo, Daejeon (KR); Jong-Moon Chung, Seoul (KR); Hyung-Weon Cho, Seoul (KR); Ki-Yong Jin, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1004 days.

(21) Appl. No.: 12/153,439

(22) Filed: May 19, 2008

(65) Prior Publication Data

US 2009/0154407 A1   Jun. 18, 2009

(30) Foreign Application Priority Data

Dec. 17, 2007   (KR) .................. 10-2007-0132613

(51) Int. Cl.
  *H04J 3/00*  (2006.01)
(52) U.S. Cl. ........................................ 370/431; 370/337
(58) Field of Classification Search .................. 370/328, 370/329, 330, 338, 347, 350, 431, 436, 442, 370/443, 444, 445, 447, 448
See application file for complete search history.

(56) References Cited

U.S. PATENT DOCUMENTS

| | | | |
|---|---|---|---|
| 6,078,568 A * | 6/2000 | Wright et al. | 370/312 |
| 6,587,443 B1 * | 7/2003 | Dutta | 370/322 |
| 6,678,252 B1 * | 1/2004 | Cansever | 370/253 |
| 6,990,087 B2 * | 1/2006 | Rao et al. | 370/330 |
| 7,027,416 B1 * | 4/2006 | Kriz | 370/328 |
| 7,127,519 B2 * | 10/2006 | Li | 709/230 |
| 7,885,240 B2 * | 2/2011 | Joshi et al. | 370/337 |
| 2003/0033394 A1 * | 2/2003 | Stine | 709/222 |
| 2003/0063585 A1 * | 4/2003 | Younis et al. | 370/331 |
| 2004/0081193 A1 * | 4/2004 | Forest et al. | 370/458 |
| 2005/0007997 A1 * | 1/2005 | Morton et al. | 370/351 |

(Continued)

FOREIGN PATENT DOCUMENTS

EP   1 499 075 A1   1/2005

(Continued)

OTHER PUBLICATIONS

Korean Office Action dated Aug. 26, 2009 and issued in corresponding Korean Patent Application 10-2007-0132613.

*Primary Examiner* — Chi Pham
*Assistant Examiner* — Prince A Mensah
(74) *Attorney, Agent, or Firm* — Staas & Halsey LLP

(57) ABSTRACT

Provided is a method of performing a routing and allocating a resource in a wireless sensor network. The method includes electing one or more cluster heads, each representing each of one or more clusters comprised of a plurality of sensor nodes, selecting a routing path between the cluster heads and the plurality of sensor nodes, selecting a frame length based on elements and distribution methods of the wireless sensor network and the routing path, forming a time slot resource allocation table for communication between the cluster heads, and exchanging the time slot resource allocation table between the cluster heads separated by one hop. The present invention can enhance the reliability of the wireless sensor network and QoS by effectively performing routing and allocating resources in such a manner that various data requirements can be satisfied.

12 Claims, 7 Drawing Sheets

U.S. PATENT DOCUMENTS

| | | | |
|---|---|---|---|
| 2005/0078672 A1* | 4/2005 | Caliskan et al. | 370/389 |
| 2005/0286477 A1* | 12/2005 | Gupta et al. | 370/338 |
| 2006/0114940 A1* | 6/2006 | Cho et al. | 370/498 |
| 2006/0198346 A1* | 9/2006 | Liu et al. | 370/338 |
| 2006/0203768 A1* | 9/2006 | Stolyar | 370/329 |
| 2007/0019594 A1* | 1/2007 | Perumal et al. | 370/338 |
| 2007/0019604 A1* | 1/2007 | Hur et al. | 370/347 |
| 2007/0047510 A1* | 3/2007 | Cho et al. | 370/338 |
| 2007/0110000 A1* | 5/2007 | Abedi | 370/332 |
| 2008/0132264 A1* | 6/2008 | Krishnamurthy et al. | 455/522 |
| 2008/0137620 A1* | 6/2008 | Wang et al. | 370/337 |
| 2008/0188230 A1* | 8/2008 | Jeon et al. | 455/450 |
| 2008/0253327 A1* | 10/2008 | Kohvakka et al. | 370/330 |
| 2009/0010205 A1* | 1/2009 | Pratt et al. | 370/328 |

FOREIGN PATENT DOCUMENTS

| | | |
|---|---|---|
| KR | 10-2006-0011329 | 2/2006 |
| KR | 10-2007-0007642 | 1/2007 |
| KR | 10-2007-0024995 | 3/2007 |

* cited by examiner

METHOD OF PERFORMING ROUTING AND ALLOCATING RESOURCES IN WIRELESS SENSOR NETWORK

CROSS-REFERENCE TO RELATED PATENT APPLICATION

This application claims the benefit of Korean Patent Application No. 10-2007-0132613, filed on Dec. 17, 2007, in the Korean Intellectual Property Office, the disclosure of which is incorporated herein in its entirety by reference.

BACKGROUND OF THE INVENTION

1. Field of the Invention

The present invention relates to a method that can guarantee the Quality of Service (QoS) in a clustering topology-based wireless sensor network, and a method of allocating time slots related with this.

More particularly, the present invention relates to a method of enhancing the QoS through the formation of a more reliable path setup in the setting of a path from a source node to a destination node, and the realizing of a time slot allocation necessary for this enhancement of the QoS.

The present invention is derived from a research project supported by the Information Technology (IT) Research & Development (R&D) program of the Ministry of Information and Communication (MIC) and the Institute for Information Technology Advancement (IITA) [2005-S-106-03, Development of Sensor Tag and Sensor Node Technologies for RFID/USN].

2. Description of the Related Art

In general, data generated in a wireless sensor network includes various kinds of data, such as application data, path setup data, scheduling data containing information on time slot allocation, etc. While these kinds of data may be classified in various ways, they are typically classified into relatively low priority data, such as data periodically updated for maintenance of the network or data indicating that a node is alive, and relatively high priority data, such as an alarm message that must be rapidly and reliably delivered to a destination.

However, since all these kinds of data are mixed and delivered through one path, a technique to classify these kinds of data and deliver the classified data to destinations suitable for a specific kind of data is needed. That is, since the different kinds of data require different QoS levels, a technique that can set a transmission path suitable for data characteristics and reliably deliver the data to a destination is needed in order to support this requirement.

FIG. 1 is a schematic view showing an example of a path setup method that can be used in a wireless sensor network. Referring to FIG. 1, sensor nodes elect a cluster head on the basis of energy level through a communication with neighboring nodes to form one cluster, and the cluster head communicates with another cluster to form an upper level cluster 102. When a hierarchical structure is formed through the above procedure, it becomes possible to form one path from a source node to a destination node using this structure. In addition, all cluster headers store information on this path in a routing table, and transmit traffic to be generated later using the routing table.

FIG. 2 is a schematic view for illustrating an example of a wireless sensor network comprised of a cluster head 201 and general nodes in the cluster head 201. Referring to FIG. 2, the wireless sensor network delivers data to a destination through communication between the cluster head 201 and the general nodes 202 and through a multi-hop relay between the cluster heads 201. Since a multi-hop is generated in all nodes constituting the network, the multi-hop acts as an interference signal 203 on the neighboring nodes 202. In a conventional time slot allocation method, resources are allocated without considering the interference generated by the multi-hop.

After a path is set by transmitting and receiving routing information and if the path is cut later, the conventional communication method in a wireless sensor network cannot guarantee that data requiring a high QoS can be reliably delivered and does not take into account interference generated between the paths in the allocation of time slots after the path is set. To this end, the conventional communication method has no way of ensuring a high QoS.

SUMMARY OF THE INVENTION

The present invention provides a method of performing routing and allocation resources that can guarantee high QoS by reliably setting a routing path and allocating time slots in consideration of interference generated in neighboring nodes in a wireless sensor network environment with limited resources, various kinds of data and a multi-hop relay.

According to an aspect of the present invention, there is provided a method of performing routing and allocating resources in a wireless sensor network, the method comprising: electing one or more cluster heads, each representing each of one or more clusters comprised of a plurality of sensor nodes; selecting a routing path between each of the cluster heads and the plurality of sensor nodes which belong to the cluster represented by each of the cluster heads; selecting a frame length based on elements and distribution methods of the wireless sensor network and the routing path; forming a time slot resource allocation table for communication between the cluster heads; and exchanging the time slot resource allocation table between the cluster heads separated by one hop.

According to another aspect of the present invention, there is provided a method of performing routing and allocating resources in a wireless sensor network, the method comprising: selecting a routing path between clusters to initialize the wireless sensor network; allocating, by each of cluster heads representing each of the clusters, resources to a sensor node based on a resource allocation request of the sensor node and a time slot resource allocation table formed by each of the cluster heads through an exchange between the cluster heads; transmitting, by the sensor node, data to the cluster heads using the allocated resource; and collecting and classifying, by the cluster heads, the data and transmitting the classified data to a neighboring cluster head.

According to an aspect of the present invention, there is provided a method of performing routing and allocating resources in a wireless sensor network. In this method, after a sensor node is first disposed on a field, a basic network for communication is formed through an initializing operation, and sensor data collected in a normal state are exchanged. In the normal state, network information is periodically updated, and a channel allocation established in the initializing operation is corrected and complemented on the basis of the updated information, thereby efficiently delivering the sensor data and effectively coping with a network variation.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. The technical descriptions including terms that can be easily understood by those skilled in the art will, however, be omitted.

Figure 1:
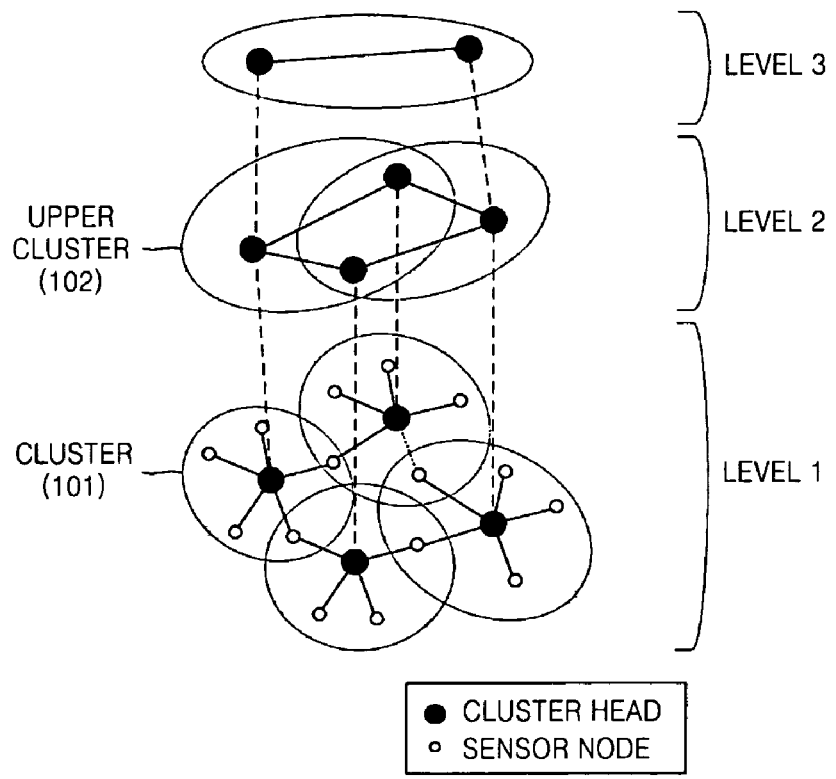
FIG. 1 is a schematic view for illustrating a conventional path setup method.
Figure 2:
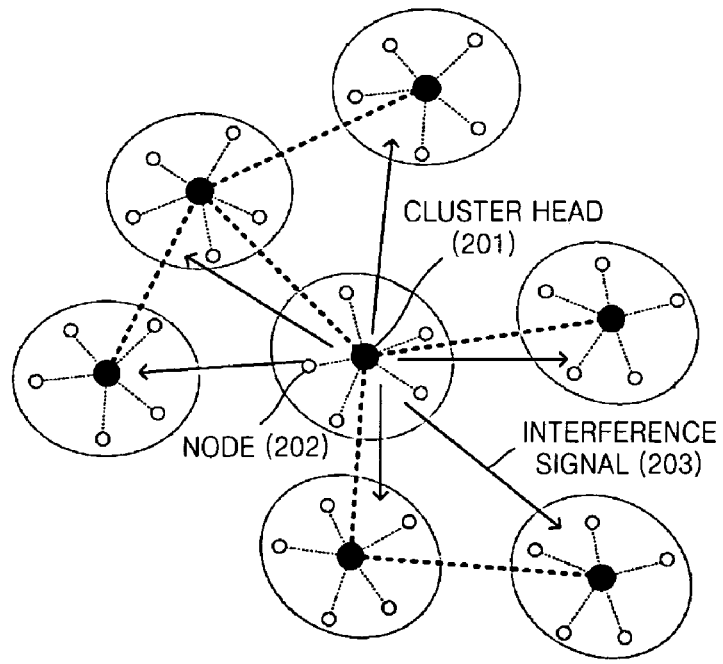
FIG. 2 is a schematic view for illustrating the constitution of a conventional wireless sensor network.
Figure 3:
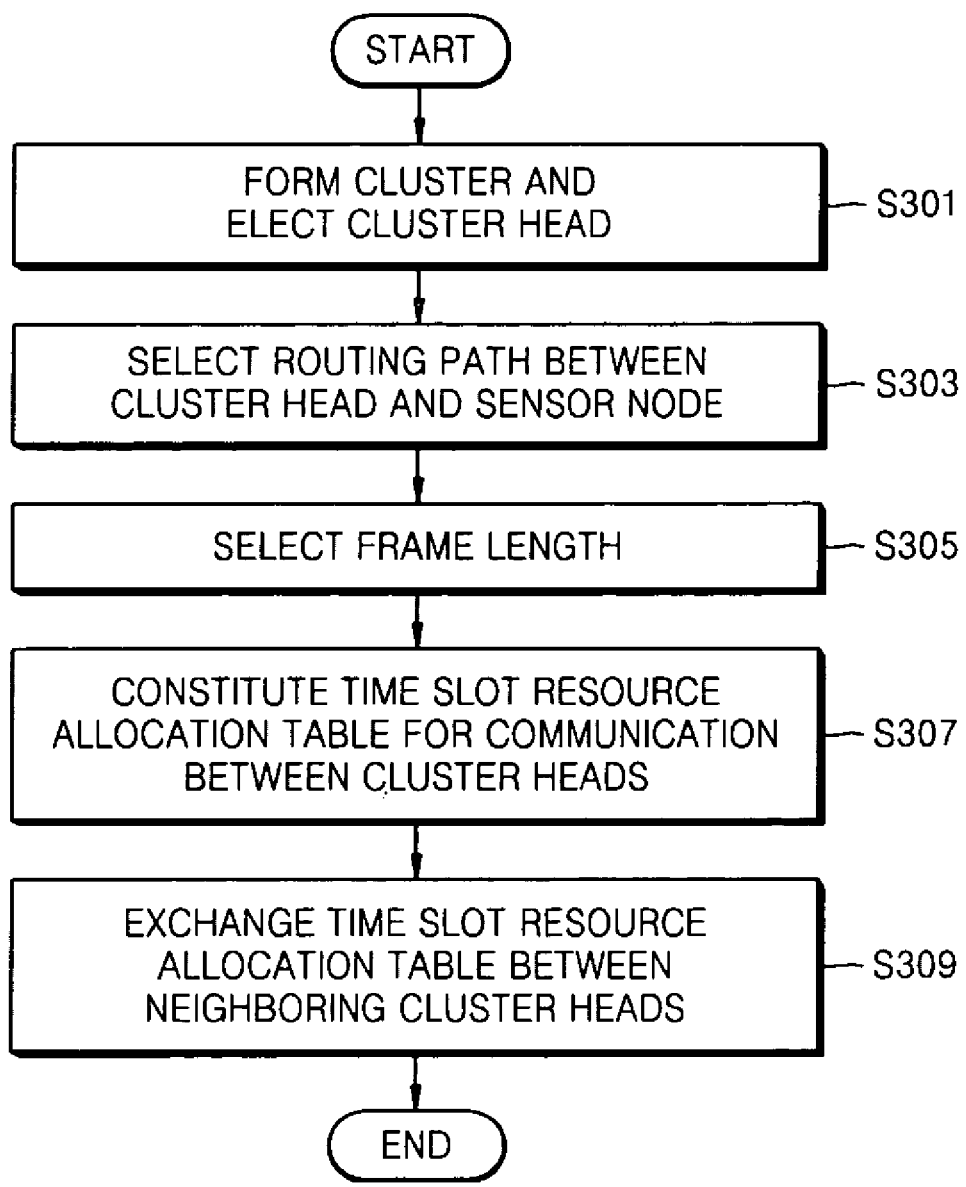
FIG. 3 is a flowchart for illustrating a method of performing routing and allocating resources in a wireless sensor network according to an embodiment of the present invention.
Figure 4:
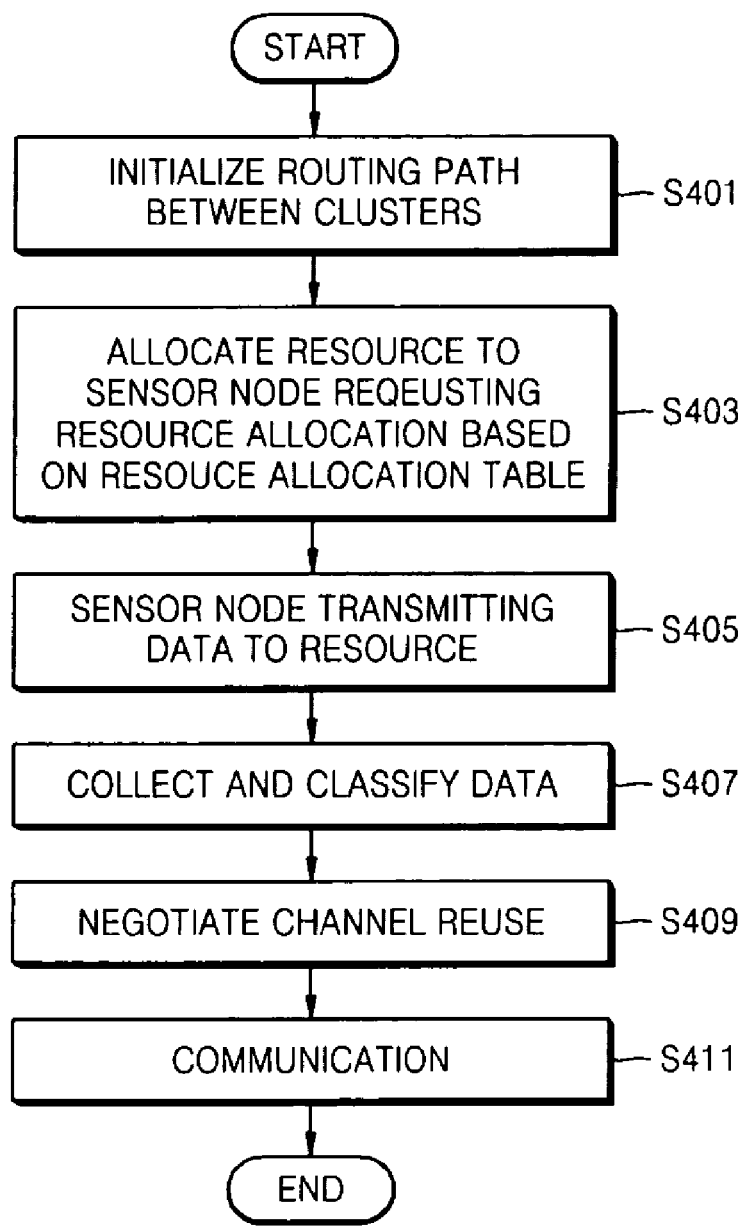
FIG. 4 is a flowchart for illustrating a method of performing routing and allocating resources in a wireless sensor network according to another embodiment of the present invention.
Figure 5:
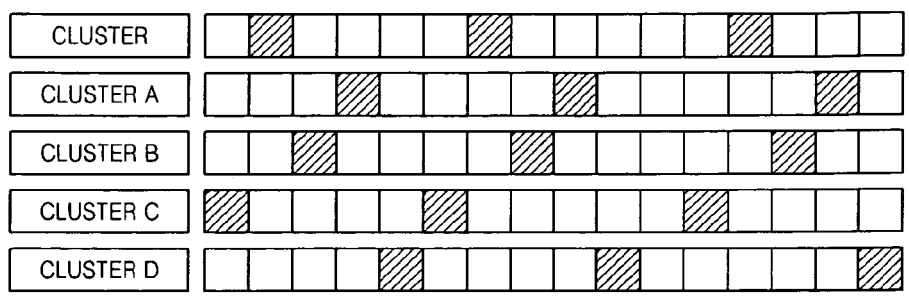
FIG. 5 is a schematic view for illustrating a time slot allocation table according to the present invention.

FIG. 3 is a flowchart for illustrating a method of performing a routing and allocating a resource in a wireless sensor network according to an embodiment of the present invention, FIG. 4 is a flowchart for illustrating a method of performing a routing and allocating a resource in a wireless sensor network according to another embodiment of the present invention, and FIG. 5 is a schematic view for illustrating a time slot allocation table according to the present invention.

In more detail, FIG. 3 shows operations of an initializing step according to the present invention. Referring to FIG. 3, in operation S301, when sensor nodes are first disposed on a field, a cluster is formed. The cluster elects a cluster head, which manages the cluster and delivers information collected in the cluster to an upper cluster or a neighboring cluster. After the cluster is formed and the cluster head is elected, a wireless sensor network selects a routing path between the cluster head and the node of collecting data according to a QoS requirement of the network in operation S303. At this time, the routing path may be selected two or more in order to satisfy the QoS requirement and guarantee a reliable communication even in an error circumstance that may occur in a wireless path.

In order to constitute and maintain control information and other networks, the present invention allocates resources using a contention protocol, and for sensor data communication, the present invention allocates resources using a time division multiple access method that is a contention free protocol. Accordingly, a frame comprised of a plurality of time slots usable as resources is needed and it is required to set a proper frame length according to the constitution of the network in operation S305. In the operation S305 of optimizing the frame length, an optimized frame length is calculated taking into account elements of the network, a distribution method employed and a routing path. When the frame length is fixed, a time slot resource allocation table for communication between the cluster heads is formed on the basis of each routing path in order to minimize interference between the clusters and maximize the performance of the network in operation S307. The formed time slot resource allocation table is exchanged with 1-hop neighboring cluster head in operation S309, and the time slot resource allocation table of the 1-hop neighboring cluster head obtained through the exchange is recorded on an internal time slot resource allocation table in order to use the time slot resource allocation table of the 1-hop neighboring cluster head in the internal resource allocation of the cluster. When the exchange of the time slot resource allocation table between the cluster heads is completed, the initializing operation is ended.

Next, operations subsequent to the ending of the initializing operation S401 will be described with reference to FIG. 4 according to the sequence shown in FIG. 3.

In a normal state, resources are allocated to inner nodes of a cluster in order to minimize interference between the clusters with reference to resource allocation request information requested at an inside of the cluster and the time slot resource allocation table is exchanged between the cluster heads in operation S403. FIG. 5 shows an example of a time slot resource allocation table stored in a cluster after the time slot resource allocation tables are exchanged. Referring to FIG. 5, the cluster head allocates resources to the internal nodes of each of the clusters with reference to the time slot resource allocation table in order to minimize interference with a neighboring cluster. The internal nodes of each of the clusters transmits sensor data through the resources allocated when sensor data is generated, to the cluster head in operation S405. Generally, a plurality of sensor nodes collects and transmits the same sensor data. However, the duplicated transmission of the same sensor data by the sensor nodes is a major cause of inefficient use of resources, network delay and energy waste. In the operation 407 of collecting and classifying data, if more than one piece of data to be transmitted is the same, only one piece of the data is selected and then delivered to a data collection node or a neighboring node existing on a path through the allocated time slot. Thereafter, the remaining data not selected is removed.

As shown in FIG. 5, different time slots are allocated to a cluster and neighboring clusters A to D, i.e., the respective clusters have different hatched boxes.

Since the wireless sensor network according to the present invention has objects, such as a fixed sensor node and movable sensor nodes, its routing path varies with time. Also, when considering the characteristics of the wireless sensor network, since addition or deletion of a sensor node takes place continuously, the wireless sensor network also varies with time in this way. To provide a reliable service in a network continuously varying with time, it is required to correct the routing path and update resource allocation degree at the same time.

For this purpose, the cluster heads exchanges network information to cope with the variation of the network based on the contention protocol. Since this network information is less sensitive to transmission delay than sensor data and requires a relatively less reliability and less bandwidth, it is more effective to exchange information using a searched time slot not used by sensor nodes than to allocate a time slot. Also, in the present invention, resources are preferentially allocated to data, which is deemed to be of higher importance, in consideration of QoS, types of data and priorities. When more resources than the allocated resource are requested, the internal nodes of a cluster receives allocation of additive resources through a channel reuse negotiation operation S409 with a cluster head, which has received allocation of a resource but is not using the allocated resource since there is no data to be transmitted. Data is normally transmitted or received through this procedure, and a QoS capable of optimally and reliably using the resource or services depending on data types and priorities may be effectively supported in operation S411.

Figure 6:
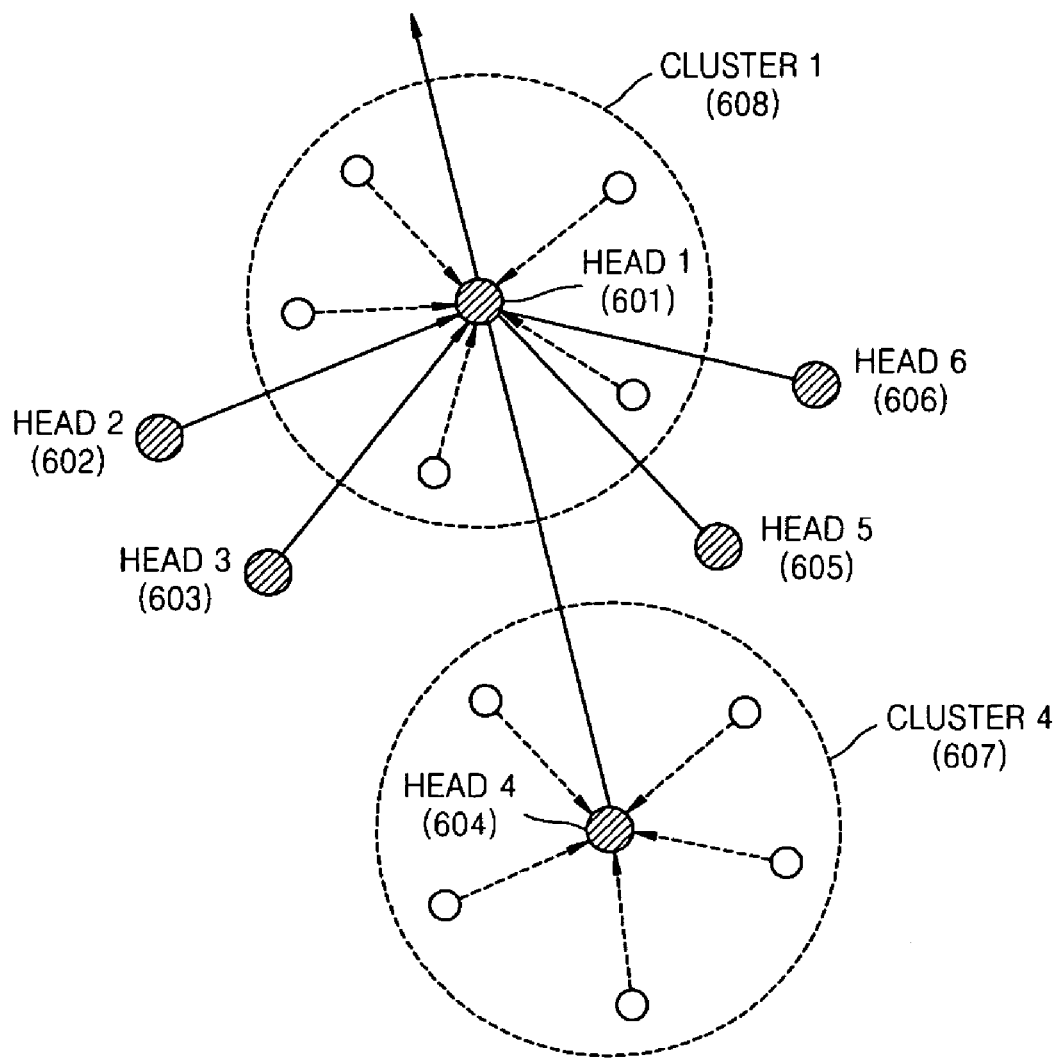
FIG. 6 is a schematic view showing a part of a network relating to resource allocation in a wireless sensor network according to the present invention.

FIG. 6 is a schematic view showing a part of a sensor network in order to specifically describe the resource allocation operation S403 and the data collecting/classifying operation S407 described with reference to FIG. 4.

Referring to FIG. 6, Cluster IV 607 includes Head IV 604, which is a cluster head node, and a plurality of sensor nodes. Like Cluster IV 607, while each of the other clusters also includes a cluster head and a plurality of sensor nodes, the remaining clusters except for Clusters I and IV are omitted for the simplicity of the drawing. The plurality of sensor nodes constituting Cluster IV 607 request a resource using a contention protocol in order to deliver collected information to Head IV 604, which is a cluster head node, and accordingly Head IV allocates the requested resource to the plurality of sensor nodes using a vacant time slot confirmed from the time slot resource allocation table shown in FIG. 5 and the resource used by a head node separated by one hop or more. The resource used by the head node separated by one hop or more can be allocated because an intensity of a wireless signal used for an internal communication of the cluster is much lower than an intensity of a wireless signal for a communication between clusters.

Figure 7:
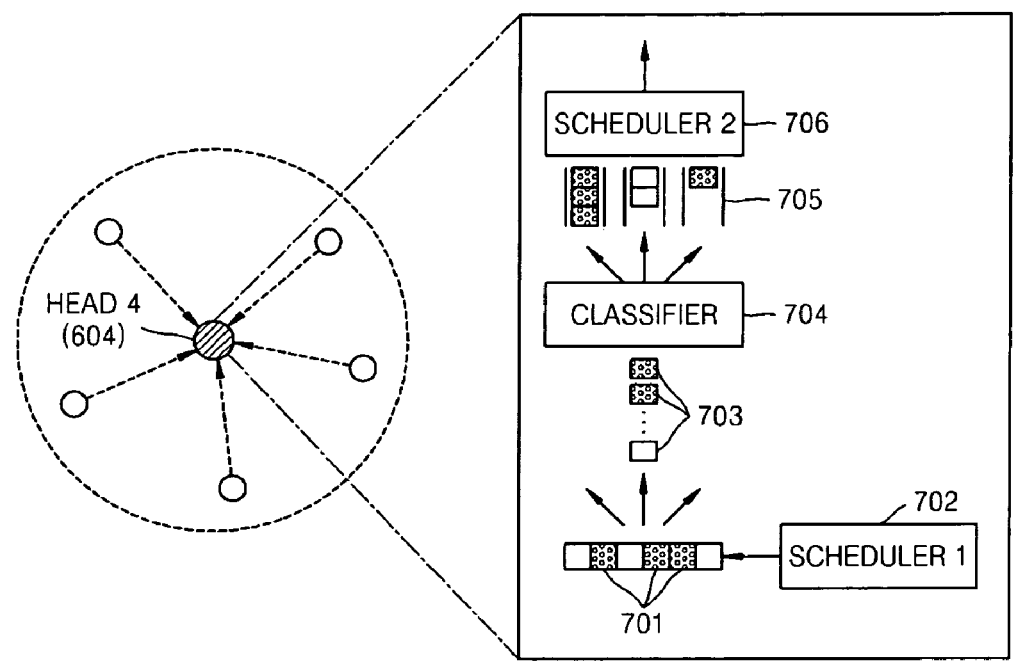
FIG. 7 is a schematic view for illustrating a scheduler and a data classifier for internal resource allocation of cluster according to the present invention.

FIG. 7 is a schematic view for illustrating a scheduler and a data classifier for resource allocation in Cluster IV shown in FIG. 6. Referring to FIG. 7, Scheduler I 702 of Head IV 604 to which the internal node requests allocation of a resource allocates the internal node of the cluster requesting the resource to a usable time slot using the time slot resource allocation table shown in FIG. 5. At this time, sensor data which the internal nodes of the cluster intend to transmit may include simple periodic sensor data and various kinds of nonperiodic data that can be transmitted in real time or not in real time. Scheduler I 702 allocates resources in consideration of QoS, priorities, transmission block probability and the like.

The internal nodes, which receive allocation of the resources, match the allocated resources with given time slots and transmit the matched resources. Head IV 604 separately controls the classifier 704 to classify the received sensor data in consideration of QoS, data types, priorities and the like and an internal memory 705 to store the classified data. Due to a limitation that communication resources are restricted and a similarity of the sensor data collected by an adjacent node, not all of the sensor data transmitted by the internal nodes is delivered to a destination. This is a condition necessary for efficiently using the restricted resources and minimizing energy consumption in each node. For these purposes, Head IV 604 includes Scheduler II 706 having a different function than Scheduler I 702. Scheduler II 706 selectively delivers data to a destination in consideration of QoS, data types, priorities and the like required by the network. Also, if necessary, Scheduler II 706 may delete some of the sensor data received and stored in the memory periodically or non-periodically in consideration of capacity of the memory. Data classified by Scheduler II 706 is delivered to another cluster head positioned at a destination or on a path to a destination. In FIG. 6, data processed in Head IV 604 is delivered to Head I 601.

Like Head IV 607, since Head I 601 shown in FIG. 6 includes a scheduler for allocating a resource and a classifier for collecting and classifying data, Head I 601 processes sensor data generated in Cluster I 608. In addition, Head I 601 must process data delivered from neighboring cluster heads. That is, Head I 601 must deliver sensor data delivered from neighboring clusters to another cluster head positioned at a destination or on a path to a destination, together with the functions of allocating resources and collecting sensor data generated therein.

Figure 8:
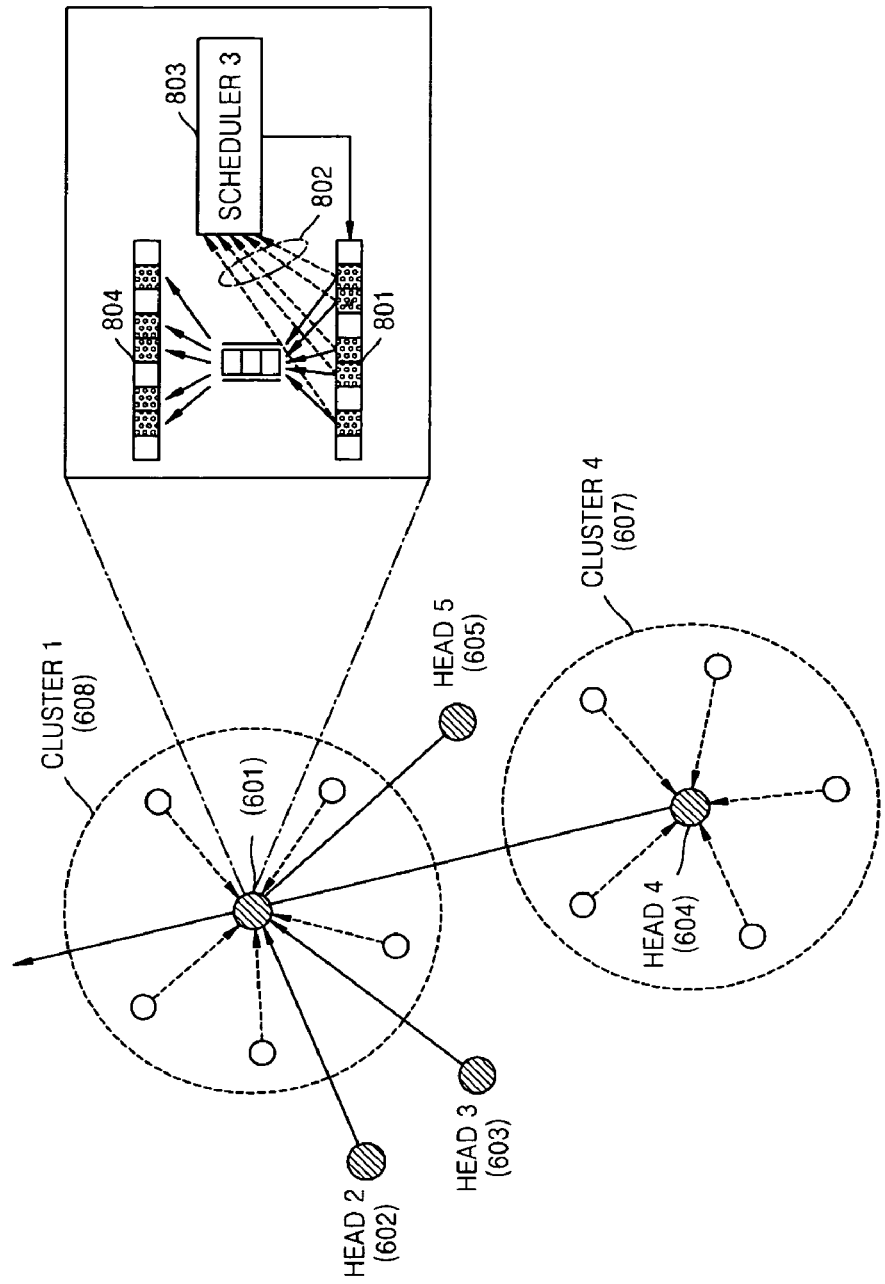
FIG. 8 is a schematic view for illustrating a scheduler for processing data delivered from a neighboring cluster and internal data of a cluster according to the present invention.

In order to process sensor data generated in the cluster and sensor data delivered from the neighboring cluster heads, a separate additional scheduler is needed. FIG. 8 is a schematic view illustrating Scheduler III 803 for processing sensor data delivered from a neighboring cluster head and for processing internal data of Cluster I in Head I 601 shown in FIG. 6. Also, FIG. 8 shows a time slot 801 for transmitting data delivered from a neighboring cluster head and for transmitting internal data of Cluster I using the time slot resource allocation table of FIG. 5. Scheduler III 803 extracts and refers to information 802 indicating QoS, data types and priorities among the data delivered from the neighboring cluster head and the internal data of Cluster I during a scheduling. Reference numeral 804 indicates a time slot resource, which is allocated in order to transmit data from Head I 601 to another cluster head positioned at a destination or on a path to a destination. In the case where periodic sensor data is transmitted, Head I may temporarily store data delivered through the time slot 801 in the internal memory and then transmit the stored data to another cluster head positioned at a destination or on a path to a destination through the time slot 804. However, in the case where non-periodic sensor data or sensor data requesting additional resource is generated, Scheduler III 803 redistributes some portions of a time slot occupied by periodic sensor data or sensor data with a low importance in consideration of QoS, data types, priorities and the like in order to perform a service for such data with a high importance.

All cluster heads constituting the network include the schedulers and the classifier and allocate resources on the basis of the schedulers and the classifier, so that an effective service can be provided depending on QoS, data types and priorities.

As described above, the method of performing routing and allocating a resource in a wireless sensor network according to the present invention can enhance the reliability of the wireless sensor network and QoS by effectively performing routing and allocating of a resource in such a manner that can satisfy various data requirements.

Also, the above method can anticipate an efficient use of resource and secure the communication reliability of nodes constituting the network to enhance the performance of the network by setting an additional path with a different QoS, allocating a resource in consideration of an interference generated between neighboring nodes and flexibly allocating time slots through a channel reuse negotiation.

The invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of performing routing and allocating resources in a wireless sensor network, the method comprising:
    electing one or more cluster heads, each representing each of one or more clusters comprised of a plurality of sensor nodes;
    selecting a routing path between each of the cluster heads and the plurality of sensor nodes which belong to the cluster represented by each of the cluster heads;
    selecting a frame length based on elements and distribution methods of the wireless sensor network and the routing path;
    forming a time slot resource allocation table for communication between the cluster heads; and
    exchanging the time slot resource allocation table between the cluster heads separated by one hop,
    wherein the selecting of a frame length employs a contention protocol when the frame length is selected in consideration of information data relating to the constitution and maintenance of the wireless sensor network and employs a contention free protocol when the frame length is selected in consideration of data to be communicated between the sensor nodes.

2. The method of claim 1, wherein the routing path comprises at least two paths.

3. The method of claim 2, wherein the routing path is selected to provide a QoS (Quality of Service) required according to a type of data exchanged in the wireless sensor network.

4. A method of performing routing and allocating resources in a wireless sensor network, the method comprising:
    selecting a routing path between clusters to initialize the wireless sensor network;
    allocating, by each of cluster heads representing each of the clusters, resources to a sensor node based on a resource allocation request of the sensor node and a time slot resource allocation table formed by each of the cluster heads through an exchange between the cluster heads;
    transmitting, by the sensor node, data to the cluster heads using the allocated resource; and
    collecting and classifying, by the cluster heads, the data and transmitting the classified data to a neighboring cluster head,
    wherein the selecting of a frame length employs a contention protocol when the frame length is selected in consideration of information data relating to the constitution and maintenance of the wireless sensor network and employs a contention free protocol when the frame length is selected in consideration of data to be communicated between the sensor nodes; and
    wherein the initializing of the wireless sensor network comprises:
        electing one or more cluster heads, each representing each of one or more clusters comprised of a plurality of sensor nodes;
        selecting the routing path between the cluster heads and the plurality of sensor nodes which belong to the cluster represented by each of the cluster heads;
        selecting a frame length based on elements and distribution methods of the wireless sensor network and the routing path;
        forming the time slot resource allocation table for communication between the cluster heads; and
        exchanging the time slot resource allocation table between the cluster heads separated by one hop.

5. The method of claim 4, wherein the routing path comprises at least two paths.

6. The method of claim 5, wherein the routing path is selected to provide a QoS (Quality of Service) required according to a type of data exchanged in the wireless sensor network.

7. The method of claim 4, wherein in the allocating of the resources to a sensor node by each of the cluster heads, the resources are allocated by allocating a time slot with respect to the sensor nodes managed by the cluster head such that an interference between the cluster head and a neighboring cluster is minimized.

8. The method of claim 7, wherein the allocating of the resource, by each of the cluster heads, to a sensor node comprises:
    a first scheduling allocating a usable time slot referring to the time slot resource allocation table according to a resource allocation request of the sensor nodes;
    receiving and classifying, data, which matches with the allocated time slot and is transmitted by the sensor nodes; and
    a second scheduling selectively transmitting the classified data to a neighboring cluster head based on a reference including QoS, data types and priorities.

9. The method of claim 8, wherein the second scheduling step further comprises removing the classified data periodically or non-periodically.

10. The method of claim 7, wherein the second scheduling step comprises:
    receiving data from a neighboring cluster head;
    receiving data from internal sensor nodes of the cluster; and
    a third scheduling selectively outputting data received from the neighboring cluster head and the internal sensor nodes of the cluster, based on a reference including QoS, data types and priorities.

11. The method of claim 10, wherein the third scheduling step comprises allocating a time slot occupied by periodic data or sensor data with a low priority to non-periodic data or sensor data needing an additional resource.

12. The method of claim 4, further comprising exchanging network information between the cluster heads through a time slot not used by the sensor nodes, the network information including resource allocation information of each cluster.

* * * * *

UNITED STATES PATENT AND TRADEMARK OFFICE
CERTIFICATE OF CORRECTION

PATENT NO. : 8,228,934 B2
APPLICATION NO. : 12/153439
DATED : July 24, 2012
INVENTOR(S) : Wun-Cheol Jeong et al.

It is certified that error appears in the above-identified patent and that said Letters Patent is hereby corrected as shown below:

On the title page item (73), insert after Daejeon (KR) --, and Industry-Academic Cooperation Foundation, Yonsei University, Seoul (KR)--

Signed and Sealed this
Thirty-first Day of March, 2015

Michelle K. Lee
*Director of the United States Patent and Trademark Office*